United States Patent
Saito et al.

[11] Patent Number: 5,935,674
[45] Date of Patent: Aug. 10, 1999

[54] DISC TYPE MAGNETIC RECORDING MEDIUM

[75] Inventors: Shinji Saito; Hitoshi Noguchi; Yasushi Endo, all of Kanagawa, Japan

[73] Assignee: Fuji Photo Film Co., Ltd., Kanagawa, Japan

[21] Appl. No.: 08/886,468

[22] Filed: Jul. 1, 1997

[30] Foreign Application Priority Data

Jul. 1, 1996 [JP] Japan .................................. 8-171328
Jul. 2, 1996 [JP] Japan .................................. 8-172515

[51] Int. Cl.$^6$ ...................................................... G11B 5/82
[52] U.S. Cl. .................. 428/65.3; 428/141; 428/694 SL; 428/694 SG; 428/694 BA; 428/694 BH; 428/900
[58] Field of Search ............................ 428/65.3, 694 SL, 428/694 SG, 694 BA, 694 BH, 141, 900

[56] References Cited

U.S. PATENT DOCUMENTS

| | | | |
|---|---|---|---|
| 4,794,042 | 12/1988 | Kubota et al. | 428/328 |
| 4,876,137 | 10/1989 | Utsumi | 428/141 |
| 4,990,400 | 2/1991 | Endo et al. | 428/331 |
| 5,377,060 | 12/1994 | Nigam | 360/99.01 |
| 5,549,955 | 8/1996 | Kawamata et al. | 428/65.3 |

FOREIGN PATENT DOCUMENTS 5290354   5/1993   Japan .

*Primary Examiner*—Stevan A. Resan
*Attorney, Agent, or Firm*—Sughrue, Mion, Zinn, Macpeak & Seas, PLLC

[57] ABSTRACT

The present invention provides a disc magnetic recording medium which provides remarkable improvements in electromagnetic characteristics, particularly high density recording properties, and exhibits excellent magnetic properties with various sizes. A disc type magnetic recording medium is disclosed, comprising a substantially non-magnetic layer and a magnetic layer provided on a non-magnetic support in this order, said magnetic layer comprising a ferromagnetic metal fine powder or ferromagnetic hexagonal ferrite fine powder dispersed in a binder, wherein said non-magnetic support is an aramide or polyethylene naphthalate having a central plane average surface roughness SRa of not more than 10 mm and there is the following relationship between the thickness d ($\mu$m) of the non-magnetic support and the outermost diameter D (mm) of the recording area:

$1.25 \leq D/d \leq 2.50$ (when the non-magnetic support is an aramide)

$1.00 \leq D/d \leq 2.00$ (when the non-magnetic support is a polyethylene naphthalate)

3 Claims, 1 Drawing Sheet a: DIAMETER OF CENTRAL HOLE   b: OUTER DIAMETR OF DISK
c: DISTANCE BETWEEN PERIPHERY OF DISK AND OUTERMOST PERIPHERY OF RECORDING AREA
f: DISTANCE BETWEEN EDGE OF CENTRAL HOLE AND INNERMOST EDGE OF RECORDING AREA
D: OUTERMOST DIAMETER OF RECORDING AREA

▨ :RECORDING AREA   ☐ AND ▨ :NON-RECORDING AREA e: OUTERMOST PERIPHERY OF RECORDING AREA a: DIAMETER OF CENTRAL HOLE    b: OUTER DIAMETR OF DISK
c: DISTANCE BETWEEN PERIPHERY OF DISK AND OUTERMOST PERIPHERY OF RECORDING AREA
f: DISTANCE BETWEEN EDGE OF CENTRAL HOLE AND INNERMOST EDGE OF RECORDING AREA
D: OUTERMOST DIAMETER OF RECORDING AREA
e: OUTERMOST PERIPHERY OF RECORDING AREA

☐ :RECORDING AREA AND ▨ :NON-RECORDING AREA

DISC TYPE MAGNETIC RECORDING MEDIUM

FIELD OF THE INVENTION

The present invention relates to a disc type magnetic recording medium for high density recording comprising a magnetic layer and a non-magnetic layer and containing a ferromagnetic metal fine powder or hexagonal ferrite fine powder in the uppermost layer.

BACKGROUND OF THE INVENTION

In the art of magnetic disc, it is a recent trend to use a 2 MB MF-2HD floppy disc made of Co-modified iron oxide as a standard with personal computers. However, the capacity of such a 2MB MF-2HD floppy disc is not always sufficient to meet the recent rapid increase in the capacity of data to be processed. Thus, it has been desired to provide floppy discs having a higher capacity.

As magnetic recording media there have heretofore been widely used products obtained by coating on a non-magnetic support a magnetic layer having iron oxide, Co-modified iron oxide, $CrO_2$, ferromagnetic metal powder or hexagonal ferrite powder dispersed in a binder. Among these particulate materials, ferromagnetic metal fine powder and hexagonal ferrite fine powder are known to provide excellent high density recording properties.

Examples of large capacity discs using ferromagnetic metal fine powder having excellent high density recording properties include 10 MB MF-2TD and 21 MB MF-2SD floppy discs. Examples of large capacity discs using hexagonal ferrite fine powder having excellent high density recording properties include 4 MB MF-2ED floppy disc and 21 MB floptical. However, these floppy discs leave something to be desired with respect to capacity and performance. In order to cope with these difficulties, many attempts have been made to enhance the high density recording properties of these floppy discs.

On the other hand, a disc type magnetic recording medium comprising a thin magnetic layer and a functional non-magnetic layer has recently been developed. 100 MB class floppy discs have come into the market. In order to achieve the properties of these floppy discs, some constitutions have been proposed. For example, JP-A-5-109061 (The term "JP-A" as used herein means an "unexamined published Japanese patent application") discloses a constitution comprising a magnetic layer having Hc of not less than 1,400 Oe and a thickness of not more than 0.5 μm and a non-magnetic layer containing an electrically-conductive particle. JP-A-5-197946 discloses a constitution comprising an abrasive having a greater size than the thickness of the magnetic layer. JP-A-5-290354 discloses a constitution having a magnetic layer with a thickness of not more them 0.5 μm and a thickness fluctuate of ±15% and a predetermined surface electrical resistance. JP-A-6-68453 discloses a constitution containing two abrasives having different particle diameters in a predetermined amount on the surface layer.

However, even these approaches can hardly provide satisfactory properties as the recording density of disc type magnetic recording media rapidly increases. The reason for this difficulty was investigated. As a result, it was found that as the recording density of disc type magnetic recording media increases, the instability in the contact of the head with the media, including deterioration of so-called head contact and deformation of media, causes a remarkable deterioration of the magnetic properties of the disc type magnetic recording media. It was also found that when the disc type magnetic recording medium is rotated at a high speed to enhance the transfer speed, it is entirely vibrated or vigorously fluttered, producing a spacing between the head and the medium and hence making it impossible to obtain satisfactory properties.

In order to cope with various applications, it has been proposed to devise high density discs having various diameters. These disc media having different diameters are subject to the foregoing effects in different ways. It was thus found that the solution to these problems is complicated.

SUMMARY OF THE INVENTION

An object of the present invention is to provide a disc type magnetic recording medium which provides remarkable improvements in electromagnetic characteristics, particularly high density recording properties, and exhibits excellent magnetic properties with various sizes.

The foregoing object of the present invention will become more apparent from the following detailed description and examples.

The inventors made extensive studies of the solution to the foregoing problems. As a result, it was found that the use of a polyethylene terephthalate as a support causes the foregoing difficulties in the conventional disc media. The use of a support having a higher rigidity has been proposed. However, it was found that such a support has ill-balanced thickness and outer diameter and thus rather deteriorates the properties of the disc media than improves them. Further studies were made of these problems. As a result, it was found that the foregoing object of the present invention can be accomplished by the following constitution. Thus, the present invention has been worked out.

The present invention relates to a disc type magnetic recording medium comprising a substantially non-magnetic layer and a magnetic layer provided on a non-magnetic support in this order, said magnetic layer comprising a ferromagnetic metal fine powder or ferromagnetic hexagonal ferrite fine powder dispersed in a binder, wherein said non-magnetic support is an aramide or polyethylene naphthalate having a central plane average surface roughness SRa of not more than 10 mm and there is the following relationship between the thickness d (μm) and the outermost diameter D (mm) of the recording area:

1.25≦D/d≦2.50 (when the non-magnetic support is an aramide)

1.00≦D/d≦2.00 (when the non-magnetic support is a polyethylene naphthalate)

BRIEF DESCRIPTION OF THE DRAWING

By way of example and to make the description more clear, reference is made to the accompanying drawing in which.

DETAILED DESCRIPTION OF THE INVENTION

Figure 1:
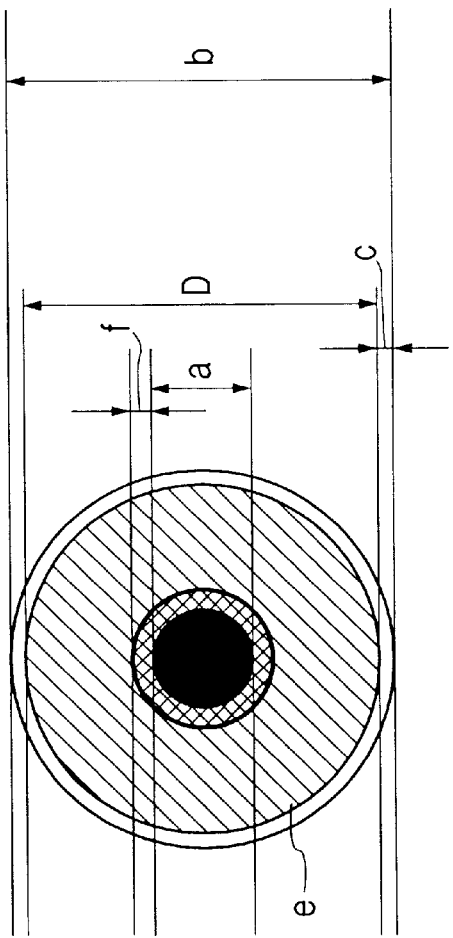
FIG. 1 is a plan view illustrating an embodiment of the disc type magnetic recording medium according to the present invention, wherein a indicates the diameter of the central hole, b indicates the outer diameter of a disc, e indicates the outermost periphery of the recording area, and D indicates the outermost diameter of the recording area.

It was found that the disc type magnetic recording medium according to the present invention exhibits uprecedetedly excellent electromagnetic characteristics in all environments with all sizes.

In the present invention, there is the following relationship between the thickness d (μm) of the non-magnetic support and the outermost diameter D (mm) of the recording area:

$1.25 \leq D/d \leq 2.50$, preferably $1.50 \leq D/d \leq 2.00$ (when the non-magnetic support is an aramide)

$1.00 \leq D/d \leq 2.00$, preferably $1.30 \leq D/d \leq 1.70$ (when the non-magnetic support is a polyethylene naphthalate)

Relationship between constitution and effect

The reason for the effect of the present invention is unknown but can be thought as follows. In the case where high density recording is effected on a disc type magnetic recording medium, it is necessary to properly and invariably control the contact of the head with the medium. However, it is thought that when the rotary speed of the disc is increased, the following phenomenon occurs. When the disc is rotated at a high speed, the head can easily float. At the same time, the flexible disc medium which rotates at a high speed shows deformation or fluctuation such as vibration and fluttering more vigorously. These phenomena make it difficult to stabilize the position of the head and the medium relative to each other, causing an output drop. It was found that this trouble occurs most remarkably on the periphery of a disc which rotates at a high peripheral speed. It is presumed that the floating of the head depends not only on the peripheral speed of the disc but also on the surface properties of the medium and the deformation or fluctuation depends on the rigidity of the medium.

Further, a flexible disc medium exhibits different deflectabilities at different points from the center thereof or from the edge of the central hole thereof when pressed under the head. Therefore, it is necessary that the rigidity of the disc be controlled to stabilize the head contact. Accordingly, it is thought that the rigidity of the medium needs to be changed to obtain a proper deflectability depending on the size of the disc.

On the other hand, it is thought that the flexible disc medium deforms after the shape of the head around the head to keep its contact with the head constant. It is presumed that this phenomenon depends on the peripheral speed and the rigidity and surface properties of the medium.

The foregoing phenomena are too complex to predict accurately.

The disc medium comprising as a support an aramide or polyethylene naphthalate (PEN) according to the present invention was experimentally confirmed to show a great fluctuation or deformation when subjected to high density recording at a high rotary speed and far better properties than the disc medium comprising the conventional polyethylene terephthalate, i.e., prevent fluttering at the periphery thereof, where its contact with the head can hardly be stabilized due to the high peripheral speed, improving its contact with the head.

It is presumed that the foregoing effect comes from the fact that the aramide or polyethylene naphthalate having a different rigidity from polyethylene terephthalate has a constitution as disclosed herein to make the head and the medium well-balanced in the foregoing complex phenomena.

Description of support

The non-magnetic support to be used herein is made of an aramide or polyethylene naphthalate. The thickness d of the non-magnetic support satisfies the foregoing relationship. In the present invention, the thickness d indicates an average thickness. In some detail, using a digital thickness meter ("MINICON" available from Tokyo Seimitsu Co., Ltd.), 10 or more samples are measured. The measurements are averaged to determine the average thickness d. The range of d is determined from the relationship $0.4\ D \leq d \leq 0.8\ D$, which is derived from the relationship $1.25 \leq D/d \leq 2.50$, when the non-magnetic support is made of an aramide. For example, when D is 35 mm, d is determined from the relationship $14\ \mu m \leq d \leq 28\ \mu m$. When D is 140 mm, d is determined from the relationship $56\ \mu m \leq d \leq 112\ \mu m$. On the other hand, when the non-magnetic support is made of a polyethylene naphthalate, the range of d is determined from the relationship $0.5\ D \leq d \leq 1.0\ D$, which is derived from the relationship $1.00 \leq D/d \leq 2.00$. For example, when D is 35 mm, d is determined from the relationship $17.5\ \mu m \leq d \leq 35\ \mu m$. When D is 140 mm, d is determined from the relationship $70\ \mu m \leq d \leq 140\ \mu m$.

In the present invention, a lamination type support may be optionally used to make difference in surface roughness between the magnetic layer side of the disc and the other side (base side) of the disc. These supports may be previously subjected to corona discharge treatment, plasma treatment, adhesive reception treatment, heat treatment, dust-proofing treatment, etc.

In order to accomplish the objects of the present invention, it is necessary that a material having a central plane average surface roughness (SRa) of not more than 10 nm, preferably not more than 5 nm, as determined by mirau method using TOPO-3D (available from WYKO Inc.) be used as a non-magnetic support. Such a non-magnetic support preferably not only has a small central plane surface average surface roughness but also is free of protrusion having a size of not less than 0.5 μm. The surface roughness of the non-magnetic support can be freely controlled by properly selecting the size and amount of a filler to be optionally incorporated in the support. Examples of the filler used herein include oxide and carbonate of Ca, Si and Ti, and finely divided powder of organic material such as acryl. The maximum height SRmax of the support is preferably not more than 1 μm. The surface roughness averaged over 10 samples, SRz is preferably not more than 0.5 μm. The central plane peak height SRp is preferably not more than 0.5 μm. The central plane valley depth SRv is preferably not more than 0.5 μm. The central plane area factor SSr is preferably from 10% to 90%. The average wavelength Sλa is preferably from 5 μm to 300 μm. In order to obtain the desired electromagnetic characteristics and durability, the distribution of surface protrusion on the support may be properly controlled. Thus, the distribution of surface protrusion on the support can be controlled such that surface protrusion having a size of from 0.01 μm to 1 μm are arranged in an amount of from 0 to 2,000 per 0.1 $mm^2$.

When the non-magnetic support to be used in the present invention is made of an aramide, its F-5 value is preferably from 30 to 60 kg/$mm^2$. The non-magnetic support preferably exhibits a thermal shrinkage factor of not more than 1%, more preferably not more than 0.7% at 150° C. for 30 minutes, or not more than 0.5%, more preferably not more than 0.1% at 105° C. for 30 minutes. The non-magnetic support exhibits an elastic modulus of from 800 to 2,000 kg/$mm^2$, preferably from 1,000 to 1,500 kg/$mm^2$. The non-magnetic support exhibits a thermal expansion coefficient of from $10^{-4}$ to $10^{-8}$/°C., preferably from $10^{-5}$ to $10^{-6}$/°C. The non-magnetic support exhibits a humid expansion coefficient of not more than $10^{-4}$/RH %, preferably not more than $10^{-5}$/RH %. These thermal properties, dimensional properties and mechanical strength properties each preferably vary within 10% from the mean value in various directions along the surface of the support.

On the other hand, when the non-magnetic support to be used in the present invention is made of a polyethylene naphthalate, its F-5 value is preferably from 10 to 40 kg/mm$^2$. The non-magnetic support preferably exhibits a thermal shrinkage factor of not more than 0.5%, more preferably not more than 0.3% at 105° C. for 30 minutes, or not more than 0.3%, more preferably not more than 0.2% at 80° C. for 30 minutes. The non-magnetic support exhibits an elastic modulus of from 500 to 1,400 kg/mm$^2$, preferably from 600 to 1,000 kg/mm$^2$. The non-magnetic support exhibits a thermal expansion coefficient of from $10^{-4}$ to $10^{-8}$/°C., preferably from $10^{-5}$ to $10^{-6}$/°C. The non-magnetic support exhibits a humid expansion coefficient of not more than $10^{-4}$/RH %, preferably not more than $10^{-5}$/RH %. These thermal properties, dimensional properties and mechanical strength properties each preferably vary within 10% from the mean value in various directions along the surface of the support.

In order to obtain an aramide support or polyethylene naphthalate support having the foregoing properties, it is preferred to properly control the longitudinal and crosswise orientation factor during film making so that no difference in properties occurs along the surface of the disc medium.

Description of shape and layer structure

The shape of the disc magnetic recording medium of the present invention is not specifically limited. In the present invention, the outermost diameter D of the recording area must satisfy the foregoing relationship. FIG. 1 is a plan view illustrating an embodiment of the disc magnetic recording medium according to the present invention wherein b represents the outer diameter of the disc and D corresponds to the outermost diameter of the recording area.

The value of D is not specifically limited. In a preferred embodiment, examples of D include from 70 mm to 140 mm for the purpose of large capacity and from 35 mm and less than 70 mm for the purpose of small size. The former value exerts its effect more greatly on recording/reproduction at a peripheral speed of not less than 10 m/sec. at the outermost periphery e of the recording area. The latter value exerts its effect more greatly on recording/reproduction at a peripheral speed of not less than 5 m/sec. at the outermost periphery e of the recording area.

There is the relationship $V=\alpha \cdot \pi D/60000=5.23\times10^{-5}\alpha \cdot D$ (m/sec.) ($\alpha$=rpm) between the peripheral speed V of the outermost periphery of the recording area and the rotary speed $\alpha$ (rpm) of the disc. Accordingly, V can be determined from D and the rotary speed $\alpha$.

The rotary speed $\alpha$ of the disc is normally from 600 rpm to 8,000 rpm, preferably 2,000 rpm to 5,000 rpm.

The diameter of the central hole a of the disc is normally from 10 mm to 50 mm.

The disc medium rotates at a lower peripheral speed and thus flutters less but exhibits a higher rigidity at the innermost portion of the recording area than the outermost portion of the recording area. Therefore, the diameter (a+2 d) of the innermost portion of the recording area is predetermined to the optimum distance from the center of the disc or the edge of the central hole of the disc such that sufficient head penetration properties can be provided. The distance f between the outermost periphery of the central hole and the innermost portion of the recording area is normally from 1 mm to 40 mm, preferably from 3 mm to 20 mm. If the distance f is too short, the resulting disc medium disadvantageously exhibits too high a rigidity at the innermost portion of the recording area. On the contrary, if the distance f is too long, the recording area is disadvantageously too small.

The distance c between the outermost periphery of the disc medium and the outermost periphery of the recording area is normally from 0.2 to 10 mm, preferably from 0.5 to 3.0 mm.

Referring to the thickness constitution of the magnetic recording medium of the present invention, the non-magnetic support needs to have a predetermined ratio to the outermost diameter D of the recording area. An undercoating layer may be provided between the non-magnetic support and the non-magnetic layer or magnetic layer to enhance the adhesivity of these layers. The thickness of the undercoating layer is from 0.01 to 2 $\mu$m, preferably from 0.02 to 0.5 $\mu$m. The present application is intended for a double-sided magnetic disc medium having a non-magnetic layer and a magnetic layer provided on both sides of a support. However, these layers may be provided on only one side of the support. In this case, a back coat layer may be provided on the side of the support opposite the side on which the non-magnetic layer and the magnetic layer are provided to achieve an effect such as antistat effect and correction of curl. The thickness of the back coat layer is from 0.1 to 4 $\mu$m, preferably from 0.3 to 2.0 $\mu$m. As the material constituting the undercoating layer and back coat layer there may be used any known materials.

The thickness of the magnetic layer in the magnetic medium of the present invention may be optimized by amount of the saturation magnetization of the head, the head gap length and the band of record signal but is normally from 0.01 $\mu$m to 1.0 $\mu$m, preferably from 0.05 $\mu$m to 0.5 $\mu$m, more preferably from 0.05 to 0.4 $\mu$m. The magnetic layer may consist of two or more layers having magnetic properties. A known multi-layer magnetic layer constitution may be employed.

The thickness of the non-magnetic layer as the subbing layer in the magnetic medium of the present invention is normally from 0.2 $\mu$m to 5.0 $\mu$m, preferably from 0.5 $\mu$m to 3.0 $\mu$m, more preferably from 1.0 $\mu$m to 2.5 $\mu$m. The subbing layer in the magnetic medium of the present invention can achieve its effect so far as it is substantially non-magnetic. For example, if the subbing layer contains a small amount of magnetic materials as impurities or intentionally, it can achieve the effect of the present invention. Needless to say, this can be considered to be substantially the same constitution as that of the present application. The term "substantially non-magnetic" as used herein is meant to indicate that the subbing layer exhibits a residual magnetic flux density of not more than 100 G, preferably zero, or a coercive force of not more than 100 Oe, preferably zero.

Description of ferromagnetic metal fine powder

As the ferromagnetic metal fine powder to be used in the magnetic layer of the present invention there may be preferably used a ferromagnetic alloy comprising $\alpha$-Fe as a main component. Such a ferromagnetic metal fine powder may contain atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B besides the predetermined atoms. In particular, at least one of Al, Si, Ca, Y, Ba, La, Nd, Co, Ni and B is preferably incorporated besides $\alpha$-Fe. More preferably, at least one of Co, Y and Al is incorporated. The content of Co is preferably from 0 to 40 atm-%, more preferably from 15 to 35 atm-%, particularly preferably from 20 to 35 atm-%, based on Fe. The content of Y is preferably from 1.5 to 12 atm-%, more preferably from 3 to 10 atm-%, particularly preferably from 4 to 9 atm-%, based on Fe. The content of Al is preferably from 1.5 to 12 atm-%, more preferably from 3 to 10 atm-%, particularly preferably from 4 to 9 atm-%, based on Fe. Such a ferromagnetic metal fine powder may be treated with the dispersant, lubricant, surface active agent or antistatic agent described later before dispersion.

The ferromagnetic metal fine powder may contain a small amount of an hydroxide or oxide. The ferromagnetic metal fine powder used herein can be obtained by any known preparation method. Examples of these preparation methods include a method which comprises reducing metal oxide with a composite organic acid salt (mainly oxalate) and a reducing gas such as hydrogen; a method which comprises reducing iron oxide with a reducing gas such as hydrogen to obtain Fe or Fe—Co particles; a method which comprises pyrolyzing a carbonylated metal compound; a method which comprises adding a reducing agent such as sodium borohydride, hypophosphite and hydrazine to an aqueous solution of a ferromagnetic metal so that it is reduced, and a method which comprises evaporating a metal in an inert gas to obtain a metal fine powder. The ferromagnetic metal fine powder thus obtained may be subjected before use to any one of known gradual oxidation processes such as process which comprises dipping the material in an organic solvent, and then drying the material, a process which comprises dipping the material in an organic solvent, blowing an oxygen-containing gas through the material to form an oxide film thereon, and then drying the material and process which comprises forming an oxide film on the surface of the material free from an organic solvent while the partial pressure of oxygen gas and an inert gas are properly adjusted.

The ferromagnetic metal fine powder to be incorporated in the magnetic layer of the present invention exhibits a specific surface area of from 45 to 80 $m^2/g$, preferably from 50 to 70 $m^2/g$ as determined by BET method. If the specific surface area of the ferromagnetic metal fine powder falls below 45 $m^2/g$, greater noises are produced. On the contrary, if the specific surface area of the ferromagnetic metal fine powder exceeds 80 $m^2/g$, the desired surface properties can be hardly obtained. The crystal size of the ferromagnetic metal fine powder to be incorporated in the magnetic layer of the present invention is from 80 to 350 Å, preferably from 100 to 250 Å, more preferably from 140 to 200 Å. The major axis length of the ferromagnetic metal fine powder is from 0.02 to 0.25 μm, preferably from 0.05 to 0.15 μm, more preferably from 0.06 to 0.1 μm. The acicular ratio of the ferromagnetic metal fine powder is preferably from 3 to 15, more preferably from 5 to 12. The ferromagnetic metal fine powder has σs of from 100 to 180 emu/g, preferably from 110 emu/g to 170 emu/g, more preferably from 125 to 160 emu/g. The coercive force of the ferromagnetic metal fine powder is from 1,400 Oe to 3,500 Oe, more preferably from 1,800 Oe to 3,000 Oe.

The water content of the ferromagnetic metal fine powder is preferably from 0.01 to 2%. The water content of the ferromagnetic metal fine powder is preferably optimized depending on the kind of the binder used. The pH value of the ferromagnetic metal fine powder is preferably optimized depending on the combination with the binder used. The pH value of the ferromagnetic metal fine powder is normally from 4 to 12, preferably from 6 to 10. If necessary, the ferromagnetic metal fine powder may be subjected to surface treatment with Al, Si, P or oxide thereof. The amount is from 0.1 to 10% based on the weight of the ferromagnetic metal fine powder. When the ferromagnetic metal fine powder is thus subjected to surface treatment, the adsorption of a lubricant such as aliphatic acid can be reduced to not more than 100 $mg/m^2$. The ferromagnetic metal fine powder occasionally contains soluble inorganic ions such as Na, Ca, Fe, Ni and Sr ions. It is preferred that the ferromagnetic metal fine powder is essentially free of these inorganic ions. However, if the content of these inorganic ions is not more than 200 ppm, it rarely has adverse effects on the properties of the ferromagnetic metal fine powder. The ferromagnetic metal fine powder to be used herein preferably has little voids. The void of the ferromagnetic metal fine powder of the present invention is preferably not more than 20 vol-%, more preferably not more than 5 vol-%. The ferromagnetic metal fine powder of the present invention may be acicular, ellipsoidal or spindle-shaped so far as it satisfies the foregoing requirements for particle size. The ferromagnetic metal fine powder itself preferably has a small SFD, more preferably a SFD of not more than 0.8. It is necessary that Hc distribution of the ferromagnetic metal fine powder be narrowed. If SFD of the ferromagnetic metal fine powder is not more than 0.8, it gives good electromagnetic characteristics and a high output. Further, it provides a sharp magnetization inversion and less peak shift favorable for high density digital magnetic recording. In order to minimize Hc distribution of the ferromagnetic metal fine powder, the particle size distribution of goethite in the ferromagnetic metal fine powder may be narrowed. Alternatively, the ferromagnetic metal fine powder may be prevented from being sintered.

Description of hexagonal ferrite fine powder

Examples of hexagonal ferrite to be incorporated in the uppermost layer of the present invention include substituted barium ferrite, substituted-strontium ferrite, substituted lead ferrite and substituted calcium ferrite. These ferrites may be substituted by Co. Specific examples of these hexagonal ferrites include magnetoplumbite type barium ferrite, magnetoplumbite type strontium ferrite, magnetoplumbite type ferrite coated with spinnel, and magnetoplumbite type barium ferrite and strontium ferrite partly having a spinnel phase. The hexagonal ferrite may contain any atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb besides the predetermined atoms. In general, a hexagonal ferrite containing elements such as Co—Ti, Co—Ti—Zr, Co—Ti—Zn, Ni—Ti—Zn, Nb—Zn—Co, Sb—Zn—Co and Nb—Zn may be used. Some raw materials or preparation methods provide hexagonal ferrites containing specific impurities.

The particle size of the hexagonal ferrite is from 10 to 200 nm, preferably from 20 to 100 nm as calculated in terms of diameter of hexagonal plate.

In the case of reproduction by a magnetic resistant head, it is necessary that the resulting noise be minimized. This requires the use of hexagonal ferrite having a tabular diameter of not more than 40 nm. If the diameter of hexagonal ferrite is not more than 10 nm, the resulting thermal fluctuation makes it impossible to expect a stable magnetization. On the contrary, if the diameter of hexagonal ferrite is not less than 20 nm, great noises are produced. In any case, high density magnetic recording cannot be effected. The tabular ratio (diameter/thickness) of the hexagonal ferrite is preferably from 1 to 15, preferably from 2 to 7. If the tabular ratio of the hexagonal ferrite falls below this range, the packing of the hexagonal ferrite in the magnetic layer is advantageously great but a sufficient orientation cannot be obtained. On the contrary, if the tabular ratio of the hexagonal ferrite falls exceeds 15, the resulting stacking between particles causes noise increase. The hexagonal ferrite having the foregoing range of particle size exhibits a specific surface area of from 10 to 200 $m^2/g$ as determined by BET process. The specific surface area thus determined almost corresponds to the value calculated from the diameter and thickness of the tablet. The crystal size of the hexagonal ferrite is normally from 50 to 450 Å, preferably from 100 to 350 Å. It is normally preferred that the distribution of tabular diameter and tabular thickness of tabular particle is as narrow as possible. The degree of this distribution can be hardly represented by numerical value. However, the comparison of this distribution can be made by random measurement of 500 particles on TEM photograph of particles. In many cases, the distribution is not normal. When the distribution is represented by the standard deviation divided by the average size (σ/average size), it is from 0.1 to 2.0. In order to sharpen the particle size distribution, the particle production reaction system may be uniformized as much as possible and the particles thus produced may be treated such that the distribution thereof is improved. For example, a method is known which comprises selectively dissolving ultrafine particles in an acid solution. A magnetic powder having a measured coercive force of from 500 to 5,000 Oe can be prepared. The higher Hc is, the better is high density recording. However, Hc is limited by the performance of the recording head. Hc of the hexagonal ferrite is normally from 800 Oe to 4,000 Oe, preferably from 1,500 Oe to 3,500 Oe. If the saturation magnetization of the head exceeds 1.4 tesla, Hc of the hexagonal ferrite is preferably not less than 2,000 Oe. Hc of the hexagonal ferrite can be controlled by the particle size (tabular diameter and tabular thickness), the kind and amount of constituent elements, substitution site of elements, particle production reaction conditions, etc. The saturation magnetization of the hexagonal ferrite is from 40 emu/g to 80 emu/g. The saturation magnetization σs is preferably high. However, the finer is the ferrite powder, the smaller is σs. It is known that magnetoplumbite ferrite may be complexed with spinel ferrite to improve σs. Alternatively, the kind and added amount of constituent elements may be properly selected. Further, W type hexagonal ferrite may be used. The magnetic powder may be treated with a substance suitable for the dispersant and binder used before dispersion. As the surface treatment there may be used an inorganic or organic compound. Representative examples of such a compound include oxide and hydroxide of Si, Al, P, etc., various silane coupling agents, and various titanium coupling agents. The amount to be added is from 0.1 to 10% based on the amount of the magnetic powder. The pH value of the magnetic powder, also, is important for dispersion. The pH value of the magnetic powder may be optimized to a range of from 4 to 12 by the dispersant and binder used. The pH value of the magnetic powder may be selected to a range of from 6 to 10 from the standpoint of chemical stability and preservability of the medium. The water content of the magnetic powder, also, has an effect on dispersion. The water content of the magnetic powder can be optimized by the dispersant and binder used but is normally selected to a range of from 0.01 to 2.0%. Examples of the process for the preparation of hexagonal ferrite include (1) a glass crystallization process which comprises mixing barium oxide, iron oxide, a metal oxide which substitutes iron, boron oxide as a glass-forming substance, etc. in such a proportion that the desired ferrite composition is obtained, melting the mixture, rapidly cooling the molten material to obtain an amorphous material, re-heating the amorphous material, washing the material, and then crushing the material to obtain a powdered barium ferrite crystal, (2) a hydrothermal reaction process which comprises neutralizing a solution of barium ferrite composition metal salt with an alkali, removing the by-products therefrom, heating the material at a temperature of not lower than 100° C. in a liquid phase, washing the material, drying the material, and then crushing the material to obtain a powdered barium ferrite crystal, and (3) a coprecipitation process which comprises neutralizing a solution of barium ferrite composition metal salt with an alkali, removing the by-products therefrom, drying the material, treating the material at a temperature of not higher than 1,100° C., and then crushing the material to obtain a barium ferrite crystal powder. In the present invention, the preparation process is not specifically limited.

Description of subbing layer (i.e. non-magnetic layer)

The details of the subbing layer (hereinafter occasionally referred to as "lower layer" or "non-magnetic layer"), if used, will be described hereinafter. The inorganic powder to be incorporated in the subbing layer (i.e., non-magnetic layer) is a non-magnetic powder. Examples of such a non-magnetic powder include inorganic compounds such as metal oxide, metal carbonate, metal sulfate, metal nitride, metal carbide and metal sulfide. Examples of the inorganic compound used herein include α-alumina having an alpha conversion of not less than 90%, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. These inorganic compounds may be used, singly or in combination. Particularly preferred among these inorganic compounds are titanium dioxide, zinc oxide, iron oxide, and barium sulfate from the standpoint of sharpness of particle size distribution and great variety of means of providing function. Even more preferred among these inorganic compounds are titanium dioxide and α-iron oxide. The particle size of these non-magnetic powders is preferably from 0.005 to 2 μm. If necessary, non-magnetic powders having different particle sizes may be combined. Alternatively, a single non-magnetic powder having a broader particle diameter distribution may be used to obtain similar effects. It is particularly preferred that the particle size of the non-magnetic powder is from 0.01 to 0.2 μm. In particular, if the non-magnetic powder is a granular metal oxide, it preferably has an average particle diameter of not more than 0.08 μm. If the non-magnetic powder is an acicular metal oxide, it preferably has a major axis length of not more than 0.3 μm. The non-magnetic powder has a tap density of from 0.05 to 2 g/ml, preferably from 0.2 to 1.5 g/ml. The non-magnetic powder has a water content of from 0.1 to 5% by weight, preferably from 0.2 to 3% by weight, more preferably from 0.3 to 1.5% by weight. The pH value of the non-magnetic powder is preferably from 2 to 11, particularly from 5.5 to 10. The non-magnetic powder has a specific surface area of from 1 to 100 $m^2/g$, preferably from 5 to 80 $m^2/g$, more preferably from 10 to 70 $m^2/g$. The crystal size of the non-magnetic powder is preferably from 0.004 to 1 μm, more preferably from 0.04 to 0.1 μm. The oil absorption of the non-magnetic powder is from 5 to 100 ml/100 g, preferably from 10 to 80 ml/100 g, more preferably from 20 to 60 ml/100 g as determined by DBP (dibutyl phthalate). The non-magnetic powder has a specific gravity of from 1 to 12, preferably from 3 to 6. The non-magnetic powder may be acicular, spherical, polyhedral or tabular. The non-magnetic powder has a Mohs' hardness of not less than 4, preferably not less than 10. The non-magnetic powder has SA (stearic acid) adsorption of from 1 to 20 $\mu mol/m^2$, preferably from 2 to 15 $\mu mol/m^2$, more preferably from 3 to 8 $\mu mol/m^2$. The pH value of the non-magnetic powder is preferably from 3 to 6. The non-magnetic powder is preferably subjected to surface treatment with $Al_2O_3$, $SiO_2$, $TiO_2$, $ZrO_2$, $SnO_2$, $Sb_2O_3$, ZnO or $Y_2O_3$. The surface treatment with $Al_2O_3$, $SiO_2$, $TiO_2$ and $ZrO_2$ is more preferred from the standpoint of dispersibility. The surface treatment with $Al_2O_3$, $SiO_2$ and $ZrO_2$ is particularly preferred. These surface treatments may be used, singly or in combination. Alternatively, a co-precipitated surface-treated layer may be used depending on the purpose. A process may be used which comprises treating the non-magnetic powder with alumina, and then treating the surface layer of the non-magnetic powder with silica. A process may be used which comprises treating the non-magnetic powder with silica, and then treating the surface layer of the non-magnetic powder with alumina. The surface-treated layer of the non-magnetic powder may be porous depending on the purpose but normally is preferably homogeneous and dense. Needless to say, the amount of the surface treatment should be optimized depending on the binder and dispersion conditions used.

Specific examples of the non-magnetic powder to be incorporated in the lower layer of the present invention include Nanotite (available from Showa Denko K.K.), HIT-100, ZA-G1 (available from Sumitomo Chemical Co., Ltd.), α-hematite DPN-250, DPN-250BX, DPN-245, DPN-270BX, DBN-SA1, DBN-SA3 (available from Toda Kogyo Corp.), titanium oxide TTO-51B, TTO-55A, TTO-55B, TTO-55C, TTO-55S, TTO-55D, SN-100, α-hematite E270, E271, E300, E303 (available from Ishihara Sangyo Kaisha, Ltd.), titanium oxide STT-4D, STT-30D, STT-30, STT-65C, α-hematite α-40 (available from Titan Kogyo K.K.), MT-100S, MT-100T, MT-150W, MT-500B, MT-600B, MT-100F, MT-500HD (available from Teika K.K.), FINEX-25, BF-1, BF-10, BF-20, ST-M (available from Sakai Chemical Industry Co., Ltd.), DEFIC-Y, DEFIC-R (available from Dowa Mining Co., Ltd.), AS2BM, TiO2P25 (available from Japan Aerosol Co., Ltd.), and 100A, 500A (available from Ube Industries, Ltd.). These non-magnetic powders may be calcined before use. Particularly preferred non-magnetic powders are titanium dioxide and α-iron oxide.

The lower layer may comprise carbon black incorporated therein to achieve known effects. In other words, the surface electrical resistance Rs of the lower layer can be reduced. Further, the light transmittance of the lower layer can be reduced. Moreover, the desired micro Vickers hardness can be obtained. The incorporation of carbon black in the lower layer can also achieve an effect of storing a lubricant. Examples of the carbon black used herein include furnace black for rubber, thermal black for rubber, carbon black for color, and acetylene black. The carbon black to be incorporated in the lower layer should be optimized with respect to the following properties depending on the desired effect. The combined use of different carbon blacks can obtain better effects.

The carbon black to be incorporated in the lower layer has a specific surface area of 100 to 500 $m^2/g$, preferably 150 to 400 $m^2/g$, and an oil absorption of 20 to 400 ml/100 g, preferably 30 to 200 ml/100 g as determined with DBP. The carbon black has an average particle diameter of 5 to 80 mμ, preferably 10 to 50 mμ, particularly 10 to 40 mμ. The carbon black preferably has a pH value of 2 to 10, a water content of 0.1 to 10% and a tap density of 0.1 to 1 g/ml. Specific examples of the carbon black used in the present invention include BLACKPEARLS 2000, 1300, 1000, 900, 800, 880, 700, VULCAN XC-72 (available from Cabot Corp.), #3050B, 3150B, 3250B, #3750B, #3950B, #950, #650B, #970B, #850B, MA-600, MA-230, #4000, #4010 (available from Mitsubishi Chemical Corp.), CONDUCTEX SC, RAVEN 8800, 8000, 7000, 5750, 5250, 3500, 2100, 2000, 1800, 1500, 1255, 1250 (available from Columbia Carbon Corp.), and Ketjen Black EC (available from Akzo Co., Ltd.). These carbon blacks may be surface-treated with a dispersant, grafted with a resin or partially graphtized before use. These carbon blacks may be added to the magnetic coating solution in the form of dispersion in a binder. These carbon blacks may be used in an amount of not more than 50% by weight based on the weight of the foregoing inorganic powder or not more than 40% by weight based on the total weight of the non-magnetic layer. These carbon blacks may be used, singly or in combination. For the details of the carbon black used in the present invention, reference can be made to *Handbook of Carbon Black,* Carbon Black Kyokai.

Further, an organic powder may be incorporated in the lower layer depending on the purpose. For example, acryl-styrene resin powder, benzoguanamine resin powder, melamine resin powder, and phthalocyanine pigment may be used. Further, polyolefin resin powder, polyester resin powder, polyamide resin powder, polyimide resin powder, and polyfluoroethylene resin may be used. The preparation of these organic powders can be accomplished by the method as described in JP-A-62-18564 and JP-A-60-255827.

For the binder, lubricant, dispersant, additives and solvent to be incorporated in the lower layer and the method for dispersing these components, those used for the magnetic layer can be employed. In particular, for the amount and kind of the binder, additives and dispersant, the known technique for the magnetic layer can be employed.

Description of binder

As the binder resin to be used in the present invention there can be used known thermoplastic resins, thermosetting resins, reactive resins or mixture thereof. As the thermoplastic resins there can be used those having a glass transition temperature of −100° C. to 150° C., a number-average molecular weight of 1,000 to 200,000, preferably 10,000 to 100,000, and a polymerization degree of about 50 to 1,000.

Examples of such thermoplastic resins include polymers or copolymers containing as constituent units vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc., polyurethane resins, and various rubber resins. Examples of the above mentioned thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, mixture of polyester resin and isocyanate prepolymer, mixture of polyester polyol and polyisocyanate, and mixture of polyurethane and polyisocyanate. These resins are further described in "Plastic Handbook", Asakura Shoten. Further, known electron radiation curing resins can be incorporated in the various layers. Examples of these resins and their preparation methods are further described in JP-A-62-256219. These resins can be used singly or in combination. Preferred examples of such a combination of resins include a combination of at least one selected from vinyl chloride resin, vinyl chloride-vinyl acetate copolymer, vinyl chloride-vinyl acetate-vinyl alcohol copolymer and vinyl chloride-vinyl acetate-maleic anhydride copolymer with a polyurethane resin, and a combination thereof with polyisocyanate.

Examples of the structure of polyurethane resins which can be used in the present invention include known structures such as polyester polyurethane, polyether polyurethane, polyether polyester polyurethane, polycarbonate polyurethane, polyester polycarbonate polyurethane and polycaprolactone polyurethane. Of all these binders, those in which at least one polar group selected from —COOM, —SO$_3$M, —OSO$_3$M, —P=O(OM)$_2$, —O—P=(OM)$_2$ (in which M represents a hydrogen atom or alkaline metal salt group), —OH, —NR$^2$, —N$^+$R$^3$ (in which R is a hydrocarbon group), epoxy group, —SH, and —CN has been introduced by copolymerization or addition reaction may be optionally used to obtain better dispersibility and durability. The amount of such a polar group is in the range of $10^{-1}$ to $10^{-8}$ mol/g, preferably $10^{-2}$ to $10^{-6}$ mol/g.

Specific examples of these binders to be used in the present invention include VAGH, VYHH, VMCH, VAGF, VAGD, VROH, VYES, VYNC, VMCC, XYHL, XYSG, PKHH, PKHJ, PKHC and PKFE (available from Union Carbide); MPR-TA, MPR-TA5, MPR-TAL, MPR-TSN, MPR-TMF, MPR-TS, MPR-TM and MPR-TAO (available from Nisshin Kagaku Kogyo K.K.); 1000W, DX80, DX81, DX82, DX83 and 100FD (available from The Electro Chemical Industrial Co., Ltd.); MR-104, MR-105, MR110, MR100, RM555, 400X-110A (available from Nippon Zeon Co., Ltd.);, Nippollan N2301, N2302 and N2304 (available from Nippon Polyurethane Co., Ltd.); T-5105, T-R3080 and T-5201, Barnok D-400 and D-210-80, and Crisvon 6109 and 7209 (available from Dainippon Ink And Chemicals, Incorporated); Vylon UR8200, UR8300, UR8700, RV530, RV280 (available from Toyobo Co., Ltd.); Diphelamine 4020, 5020, 5100, 5300, 9020, 9022 and 7020 (available from Dainichi Seika K.K.); MX5004 (available from Mitsubishi Chemical Industries Ltd.); Sunprene SP-150 (available from Sanyo Kasei K.K.); and Salan F310 and F210 (available from Asahi Chemical Industry Co., Ltd.).

The content of the binder to be contained in the magnetic layer and non-magnetic layer of the present invention is normally in the range of 5 to 50% by weight, preferably 10 to 30% by weight based on the weight of the non-magnetic powder (excluding carbon black) or magnetic powder. If a vinyl chloride resin is to be used, its content is preferably in the range of 5 to 30% by weight. If a polyurethane resin is to be used, its content is preferably in the range of 2 to 20% by weight. If a polyisocyanate is to be used, its content is preferably in the range of 2 to 20% by weight. These binder resins are preferably used in these amounts in combination. For example, if a slight amount of chlorine released causes the corrosion of the head, only a polyurethane or isocyanate may be used. In the present invention, if polyurethane is used, its glass transition temperature, breaking extension, breaking stress and yield point are preferably in the range of $-50°$ C. to $100°$ C., preferably $0°$ C. to $100°$ C., 100 to 2,000%, 0.05 to 10 kg/cm$^2$ and 0.05 to 10 kg/cm$^2$, respectively.

The magnetic recording medium of the present invention consists of at least two layers. Accordingly, it goes without saying that the amount of the binder, the amount of vinyl chloride resin, polyurethane resin, polyisocyanate or other resins to be contained in the binder, the molecular weight of resins constituting the magnetic layer, the amount of polar group, or the physical properties of the above mentioned resins can be altered from the non-magnetic layer to the magnetic layer but should be optimized for the various layers. The known technique for multi-layer magnetic layer can be employed. For example, if the amount of the binder differs from the non-magnetic layer to the magnetic layer, it is useful to increase the amount of the binder to be contained in the magnetic layer in order to reduce the occurrence of scratch on the surface of the magnetic layer. In order to improve the touch of the magnetic recording medium to the head, the amount of the binder to be contained in the non-magnetic layer may be increased to render the magnetic recording medium flexible.

Examples of polyisocyanates which can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, the reaction products of these isocyanates with polyalcohols, and polyisocyanates produced by the condensation of isocyanates. Examples of the trade names of these commercially available isocyanates include Coronate L, Coronate HL, Coronate 2030, Coronate 2031, Millionate MR and Millionate MTL (available from Nippon Polyurethane), Takenate D-102, Takenate D-110N, Takenate D-200 and Takenate D-202 (available from Takeda Chemical Industries, Ltd.), and Desmodur L, Desmodur IL, Desmodur N and Desmodur HL (available from Sumitomo Bayer). These isocyanates may be used singly. Alternatively, by making the best use of the difference in hardening reactivity, two or more of these isocyanates can be used in combination in the various layers.

Description of carbon black and abrasive

As carbon black to be incorporated in the magnetic layer of the present invention there can be used furnace black for rubber, thermal black for rubber, carbon black for color, acetylene black, etc. Such carbon black preferably has a specific surface area of 5 to 500 m$^2$/g, DBP oil absorption of 10 to 400 ml/100 g, average particle diameter of 5 nm to 300 nm, pH value of 2 to 10, water content of 0.1 to 10%, and tap density of 0.1 to 1 g/ml. Specific examples of carbon black to be used in the present invention include BLACK-PEARLS 2000, 1300, 1000, 900, 905, 800, 700, VULCAN and XC-72 (produced by Cabot); #80, #60, #55, #50, and #35 (produced by Asahi Carbon); #2400, #2300, #900, #1000, #30, #40, and #10B (produced by Mitsubishi Chemical Industries Corporation); CONDUCTEX SC, RAVEN 150, 50, 40, 15 and RAVEN-MT-P (produced by Columbia Carbon); and Ketjen Black EC (produced by Japan EC). These carbon blacks may be surface-treated with a dispersant, grafted with a resin or partially graphtized before use. These carbon blacks may be previously dispersed in a binder before being added to the magnetic coating solution. These carbon blacks may be used singly or in combination. If carbon black is to be used, its content is preferably in the range of 0.1 to 30% based on the weight of the magnetic powder. Carbon black serves to inhibit the electrification of the magnetic layer, reduce the frictional coefficient, provide light screening effect, enhance the film strength, etc. These functions vary with the kind of carbon black used. It goes without saying that these carbon blacks may be different in its kind, content and combination from the upper layer to the lower layer depending on the previously specified properties such as particle size, oil adsorption, electrical conductivity and pH. The kind, content and combination of these carbon blacks should be optimized for the various layers. For carbon blacks which can be incorporated in the upper layer of the present invention, reference can be made to "Handbook of Carbon Black", Carbon Black Kyokai. Specific examples of abrasives to be used in the present invention include α-alumina having an alpha conversion of 90 to 100%, β-alumina, silicon carbide, chromium oxide, cerium oxide, α-iron oxide, corundum, artificial diamond, silicon nitride, silicon carbide titanium carbide, titanium oxide, silicon dioxide, and boron nitride. In general, known materials having a Mohs' hardness of not less than 6 are used singly or in combination. A composite material made of these abrasives (abrasive surface-treated with another abrasive) may be used. These abrasives may contain compounds or elements other than main component but achieve similar effects so far as the content of the main component is not less than 90%. The particle size of these abrasives is preferably in the range of 0.01 to 2 μm. It is preferred that the particle size distribution is narrow for enhancing the electromagnetic characteristics. If necessary, a plurality of abrasives having different particle sizes may be used in combination or a single abrasive having a wide particle diameter distribution may be used to provide similar effects. The tap density of these abrasives is preferably in the range of 0.3 to 2 g/ml. The water content of these abrasives is preferably in the range of 0.1 to 5%. The pH value of these abrasives is preferably in the range of 2 to 11. The specific surface area of these abrasives is preferably in the range of 1 to 30 $m^2/g$. The abrasives to be used in the present invention may be acicular form, spherical form and die form. The abrasives to be used in the present invention may preferably have edges partially on the surface thereof to provide a high abrasion. Specific examples of abrasives to be used in the present invention include AKP-12, AKP-15, AKP-30, AKP-50, HIT-20, HIT-30, HIT-55, HIT-60, HIT-70, HIT-80, and HIT-100 (available from Sumitomo Chemical Co., Ltd.); ERC-DBM, HP-DBM, and HPS-DBM (available from Reynolds Corporation); WA10000 (available from Fujimi Kenmazai K.K.); UB20 (available from Uemura Kogyo K.K.); G5, Chromex U2, and Chromex U1 (available from The Nippon Chemical Industrial Co., Ltd.); TF-100, and TF-140 (available from Toda Kogyo K.K.); β-Random Ultrafine (available from Ibiden Co., Ltd.), and B-3 (available from Showa Kogyo K.K;). These abrasives may be incorporated in the non-magnetic layer as necessary. By incorporating these abrasives in the non-magnetic layer, the surface shape or the protrusion of abrasive can be controlled. Needless to say, the particle diameter and amount of the abrasive to be incorporated in the magnetic layer and non-magnetic layer should be predetermined to an optimum value.

Description of additives

As the additives to be incorporated in the magnetic layer and non-magnetic layer of the present invention there can be used those having a lubricating effect, an antistatic effect, a dispersing effect, a plasticizing effect, etc. For example, molybdenum disulfide, tungsten disulfite graphite, boron nitride, fluorinated graphite, silicone oil, silicone having a polar group, aliphatic acid-modified silicone, fluorine-containing silicone, fluorine-containing alcohol, fluorine-containing ester, polyolefin, polyglycol, alkylphosphoric acid ester and alkaline metal salt thereof, alkylsulfuric acid ester and alkaline metal salt thereof, polyphenyl ether, phenylphosphonic acid, aminoquinones, various silane coupling agents, titanium coupling agents, fluorine-containing alkylsulfuric acid ester and alkaline metal salt thereof, monoaliphatic acid ester, dialiphatic ester or trialiphatic ester of $C_{10-24}$ monobasic aliphatic acid (which may contain an unsaturated bond or may be branched) and salt thereof with metals (e.g., Li, Na, K, Cu), $C_{12-22}$ monovalent, divalent, trivalent, tetravalent, pentavalent and hexavalent alcohol (which may contain an unsaturated bond or may be branched), $C_{12-22}$ alkoxy alcohol or $C_{10-24}$ monobasic aliphatic acid (which may contain an unsaturated bond or may be branched) with one of $C_{2-12}$ monovalent, divalent, trivalent, tetravalent, pentavalent and hexavalent alcohols (which may contain an unsaturated bond or may be branched), aliphatic ester of monoalkyl ether of alkylene oxide polymer, $C_{8-22}$ aliphatic amide, $C_{8-22}$ aliphatic amine, etc. can be used.

Specific examples of such the additives include aliphatic acids such as capric acid, caprylic acid, lauric acid, myristic acid, palmitic acid, stearic acid, behenic acid, oleic acid, elaidic acid, linoleic acid, linolenic acid and isostearic acid; esters such as butyl stearate, octyl stearate, amyl stearate, isooctyl stearate, butyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate and neopentyl glycol didecanoate; alcohols such as oleyl alcohol, stearyl alcohol and lauryl alcohol; nonionic surface active agents such as alkylene oxide, glycerin, glycidol and alkylphenolethylene oxide addition product; cationic surface active agents such as cyclic amine, ester amide, quaternary ammonium salt, hydantoin derivative, heterocyclic compound, phosphonium and sulfonium; anionic surface active agents containing polar groups such as carboxylic acid, sulfonic acid, phosphoric acid, sulfate and phosphate; and amphoteric surface active agents such as amino acid, aminosulfonic acid, sulfuric acid or phosphoric acid ester of amino alcohol and alkylbetaine, etc. These surface active agents are further described in "Kaimen Kasseizai Binran (Handbook of Surface Active Agents)", Sangyo Tosho K.K. These lubricants, antistatic agents, etc. may not be necessarily 100% pure but may contain impurities such as isomer, unreacted material, by-product, decomposition product and oxide. The concentration of these impurities is preferably in the range of not more than 30%, more preferably not more than 10%.

These lubricants and surface active agents to be used in the present invention have different physical properties. The kind and amount of these lubricants and surface active agents and the proportion of lubricants which can give a synergistic effect when used in combination should be optimized depending on the purpose. For example, aliphatic acids may be varied in its melting point from the non-magnetic layer to the magnetic layer to control the oozing thereof to the surface. Esters may be varied in its boiling point or polarity from the non-magnetic layer to the magnetic layer to control the oozing thereof to the surface. The content of surface active agents may be controlled to improve the coating stability. The content of a surface active agent in the interlayer may be higher than that in the other layers to improve the lubricating effect. It goes without saying that the present invention is not limited to these examples.

In general, the total amount of the lubricant is selected in the range of from 0.1% to 50% and preferably from 2% to 25% based on the hexagonal ferrite or the non-magnetic powder.

The additives to be used in the present invention may be entirely or partially added to the system at any steps during the preparation of the magnetic and non-magnetic coating solutions. For example, these additives may be mixed with magnetic powders before kneading. Further, these additives may be added to the system at the step of kneading magnetic powders with a binder and a solvent. Alternatively, these additives may be added to the system during or after the dispersion step or immediately before the coating step. Depending on the purpose, additives may be partially or entirely applied by the simultaneous or successive coating method after the application of the magnetic layer. Further, a lubricant may be applied to the surface of the magnetic layer after calendering or slitting depending on the purpose. As the organic solvent employable herein there may be used any known organic solvent. For example, those described in JP-A-6-68453 can be used.

Description of preparation process

The process for the preparation-of the magnetic coating solution for the magnetic layer in the magnetic recording medium of the present invention comprises at least kneading step, dispersion step, and mixing step which is optionally provided before or after these steps. These steps each may consist of two or more stages. The raw materials to be used in the present invention, e.g., magnetic powders, binder resin, nonmagnetic powders, carbon black, abrasive, antistatic agent, lubricant and solvent may be added to the system at the beginning or during any step. These raw materials each may be batchwise added to the system at two or more steps. For example, polyurethane may be batchwise charged in the system at the kneading step, dispersion step or a mixing step for the viscosity adjustment after dispersion. In order to accomplish the objects of the present invention, a known preparation technique can be used as a step. In the kneading step, an apparatus having a strong kneading power such as open kneader, continuous kneader, pressure kneader and extruder is preferably used. If a kneader is used, the magnetic powders or non-magnetic powders are kneaded with the whole or part (preferably 30% by weight or more of the total weight of all binder resins) of the binder in an amount of from 15 to 500 parts by weight based on 100 parts by weight of magnetic powders. These kneading techniques are further described in JP-A-1-106388 and JP-A-1-79274. The dispersion of the magnetic layer solution and non-magnetic layer solution can be accomplished by the use of glass beads. High specific gravity media such as zirconia beads, titania beads and steel beads are suitable. The particle diameter and packing ratio of these dispersion media may be optimized. As the disperser there may be used any known machine.

As examples of the apparatus and methods for the coating of a magnetic recording medium having a multi-layer structure according to the present invention there can be preferably used the following examples. Firstly, gravure coating method, roll coating method, blade coating method, extrusion coating method or the like, which is normally used in the application of a magnetic coating solution, is employed to provide a subbing layer. An upper layer is then applied to the subbing layer by means of a support pressure type extrusion coating apparatus as disclosed in JP-B-1-46186 (the term "JP-B" as used herein means an "unexamined Japanese patent publication"), JP-A-60-238179, and JP-A-2-265672 while the subbing layer is wet. Secondly, an upper layer and a lower layer are applied almost simultaneously by means of a coating head having two coating passage slits as disclosed in JP-A-63-88080, JP-A-2-17921, and JP-A-2-265672. Thirdly, an upper layer and a lower layer are applied almost simultaneously by means of an extrusion coating apparatus with a backup roll as disclosed in JP-A-2-174965. In order to inhibit the agglomeration of ferromagnetic powder that deteriorates the electro-magnetic characteristics of the magnetic recording medium, a method as disclosed in JP-A-62-95174 and JP-A-1-236968 can be used to provide the coating solution inside the coating head with a shearing force. For the viscosity of the coating solution, the range disclosed in JP-A-3-8471 should be satisfied. In order to accomplish the constitution of the present application, a successive multi-layer coating method may be, of course, used which comprises applying a subbing layer, drying the subbing layer, and then applying a magnetic layer to the subbing layer. Even if this successive multi-layer coating method is employed, the effect of the present invention is not lost. However, in order to minimize coating defects and hence enhance quality such as prevention of dropout, the foregoing simultaneous multi-layer coating method is preferably used.

Even if the coated material is not subjected to orientation in an orientation apparatus, it may be provided with a sufficiently isotropic orientation. Nevertheless, it is preferred that a known random orientation apparatus be used. For example, cobalt magnets may be obliquely and alternately arranged. Alternatively, a solenoid may be used to apply an alternating magnetic field to the coated material. In general, the isotropic orientation, if effected in the ferromagnetic metal fine powder, is preferably produced two-dimensionally and horizontally at random. A vertical component may be added to produce a three-dimensional orientation at random. In the case of hexagonal ferrite, a three-dimensional orientation can be easily produced horizontally or vertically. However, a two-dimensional orientation can be produced horizontally. Alternatively, any known method using opposing magnets having different poles, etc. may be employed to produce a vertical orientation that can provide circumferentially isotropic magnetic characteristics. In particular, if high density recording is effected, the vertical orientation is desirable. It is preferred that the drying site of the coating film can be controlled by controlling the temperature and amount of drying air and the drying speed. The drying speed is preferably from 20 m/min. to 1,000 m/min. The temperature of the drying air is preferably not lower than 60° C. The coated material may be properly pre-dried before entering into the magnet zone.

As calendering rolls there may be used heat-resistant plastic rolls made of epoxy, polyimide, polyamide, polyimideamide or the like or metallic rolls. In particular, if it is desired to provide a double-sided magnetic layer recording medium, the coated material is preferably treated through a calendering zone composed of metallic rolls. The treatment temperature is preferably not lower than 50° C., more preferably not lower than 100° C. The linear pressure is preferably not less than 200 kg/cm, more preferably not less than 300 kg/cm.

Description of physical properties

The saturated magnetic flux density of the magnetic layer in the magnetic recording medium according to the present invention is from 2,000 G (Gauss) to 5,000 G when a ferromagnetic metal fine powder is used, or from 800 G to 3,000 G when a hexagonal ferrite is used. The magnetic layer has a coercive force Hc or Hr of from 1,000 Oe to 5,000 Oe, preferably from 1,500 Oe to 3,000 Oe. The distribution of coercive force is preferably narrow. SFD or SFDr is preferably not more than 0.6. The squareness ratio of the magnetic layer is from 0.55 to 0.67, preferably from 0.58 to 0.64 when the magnetic layer is oriented two-dimensionally at random, preferably from 0.45 to 0.55 when the magnetic layer is oriented three-dimensionally at random, preferably from 0.6 to 0.7 in the vertical direction when the magnetic layer is oriented vertically or not less than 0.7, preferably not less than 0.8 when the magnetic layer is subjected to correction for diamagnetic field. The orientation ratio is preferably not less than 0.8 regardless of whether the magnetic layer is two-dimensionally or three-dimensionally oriented at random. In the case where the magnetic layer is two-dimensionally oriented at random, the squareness ratio, Br, Hc and Hr in the vertical direction are each preferably from 0.1 to 0.5 times that in the horizontal direction.

The coefficient of the magnetic recording medium of the present invention with respect to the head is not more than 0.5, preferably not more than 0.3 at a temperature of from −10° C. to 40° C. and a humidity of from 0% to 95%. The surface resistivity of the magnetic recording medium of the present invention is preferably from $10^4$ to $10^{12}$ Ω/sq. The charged potential of the magnetic recording medium of the present invention is preferably from −500 V to +500 V. The magnetic layer and the subbing layer each preferably exhibit an elasticity modulus of from 100 to 2,000 kg/mm$^2$ in various directions at an elongation of 0.5% and a breaking strength of from 10 to 70 kg/mm$^2$. The magnetic recording medium of the present invention preferably has an elasticity modulus of from 100 to 1,500 kg/mm in various horizontal directions, a residual elongation of not more than 0.5% and a heat shrinkage of not more than 1%, more preferably not more than 0.5%, particularly preferably not more than 0.1% at various temperatures of 150° C. or less. The glass transition temperature (maximum point of loss elastic modulus determined upon the measurement of dynamic viscoelasticity at 110 Hz) of the magnetic layer is preferably not lower than 50° C. to not higher than 120° C. The glass transition temperature of the lower non-magnetic layer is preferably from 0° C. to 100° C. The loss elastic modulus of the magnetic recording medium is preferably from $1 \times 10^8$ to $8 \times 10^9$ dyne/cm$^2$. The loss tangent of the magnetic recording medium is preferably not more than 0.2. If the loss tangent of the magnetic recording medium exceeds this range, it can easily cause troubles due to tackiness. These thermal properties and mechanical properties preferably vary within 10% from the average value in various horizontal directions in the recording medium. The amount of solvents remaining in the coating layer is preferably not more than 100 mg/m$^2$, more preferably not more than 10 mg/m$^2$. The coating layer preferably has a void of not more than 30 vol-%, more preferably not more than 20 vol-%, in both the non-magnetic layer and magnetic layer. The void in the coating layer is preferably minimized to realize a high output. However, some void may be secured depending on the purpose. For example, the disc medium, which must be repeatedly used, often preferably exhibits a high void to give a desirable running durability.

The magnetic layer has a central plane surface roughness SRa of not more than 10 nm, preferably not more than 5 nm, more preferably not more than 3 nm as determined by mirau method of TOPO-3D. The magnetic layer has a maximum height SRmax of not more than 0.5 μm. The surface roughness SRz averaged over 10 samples is not more than 0.3 μm. The magnetic layer also exhibits a central plane height SRp of not more than 0.3 μm, a central plane valley depth SRv of not more than 0.3 μm, a central plane area ratio SSr of from 20% to 80% and an average wavelength Sλa of from 5 μm to 300 μm. Referring to the surface grain on the magnetic layer, grains having a size of from 0.01 to 1 μm can be arbitrarily arranged in an amount of 0 to 2,000 to optimize the friction coefficient of the magnetic layer. These factors can be easily controlled by controlling the kind and amount of filler to be incorporated in the support to give the desired surface properties, controlling the particle diameter and amount of powder to be incorporated in the magnetic layer or selecting the surface shape of the calendering roll. The curl of the magnetic layer is preferably within ±3 mm from the horizontal line.

It can easily be presumed that the physical properties of the magnetic recording medium, if it has a non-magnetic layer and a magnetic layer, may be altered between these layers depending on the purpose. For example, the elasticity of the magnetic layer can be enhanced to improve the running durability thereof while the elasticity of the non-magnetic layer can be lowered than that of the magnetic layer to improve the contact of the magnetic recording medium with the head.

The present invention will be further described in the following examples, but the present invention should not be construed as being limited thereto.

<Preparation of coating solution>

| Magnetic coating compound X | |
|---|---|
| Ferromagnetic metal fine powder | 100 parts |
| Composition: Fe: 70%; Co: 30% Hc: 2,300 Oe; specific surface area: 55 m$^2$/g; σs: 140 emu/g; crystallite size: 155 nm; major axis length: 0.065 μm; acicular ratio: 5 | |
| Sintering inhibitor: | |
| Al compound (Al/Fe atomic ratio: 8%) Y compound (Y/Fe atomic ratio: 6%) | |
| Vinyl chloride copolymer (containing —SO$_3$K) MR110 (Nippon Zeon Co., Ltd.) | 12 parts |

| -continued | |
|---|---|
| Polyurethane (containing —SO$_3$Na) UR8200 (available from Toyobo Co., Ltd.) | 3 parts |
| α-Alumina (average particle diameter: 0.2 μm) HIT55 (available from Sumitomo Chemical Co., Ltd.) | 10 parts |
| #50 (available from Asahi Carbon Co., Ltd.) | 5 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 180 parts |
| Cyclohexanone | 180 parts |
| Magnetic coating compound Y | |
| Barium ferrite magnetic powder Molar proportion to Ba: Fe 9.10, CoO 0.20, Zn 0.77; Hc: 2,500 Oe; specific surface area: 50 m$^2$/g; σs: 58 emu/g; tabular diameter: 30 nm; tabular ratio: 3.5 | |
| MR110 (available from Nippon Zeon Co., Ltd.) | 12 parts |
| UR8200 (available from Toyobo Co., Ltd.) | 3 parts |
| HIT55 (available from Sumitomo Chemical Co., Ltd.) | 10 parts |
| #50 (available from Asahi Carbon Co., Ltd.) | 5 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| Non-magnetic coating solution Z | |
| Non-magnetic power TiO$_2$ (crystalline rutile) Average primary particle diameter: 0.035 μm; specific surface area by BET method: 40 m$^2$/g; pH: 7; TiO$_2$ content: not less than 90%; DBP oil absorption: 27–38 g/100 g; surface treatment: Al$_2$O$_3$, 8% by weight | 80 parts |
| CONDUCTEX SC-U (available from Columbian Carbon Co., Ltd.) | 20 parts |
| MR110 | 12 parts |
| UR8200 | 5 parts |
| Butyl stearate | 10 parts |
| Butoxyethyl stearate | 5 parts |
| Isohexadecyl stearate | 2 parts |
| Stearic acid | 3 parts |
| 8/2 Mixture of methyl ethyl ketone and cyclohexanone | 250 parts |

Description of examples and comparative examples

For each of the foregoing three coating solutions, the various ingredients were kneaded by means of a kneader, and then subjected to dispersion by means of a sandmill. To the dispersions thus obtained was then added a polyisocyanate in an amount of 10 parts each for non-magnetic layer coating solution and magnetic layer coating solution and butyl acetate in an amount of 40 parts each for non-magnetic layer and magnetic layer. The coating solution thus obtained were each filtered through a filter having an average pore diameter of 1 μm to prepare non-magnetic layer-forming and magnetic layer-forming coating solutions.

The non-magnetic layer coating solution Z thus obtained was applied to an aramide support having a thickness of 58 μm and a surface roughness of 5 nm and a polyethylene naphthalate support having a thickness of 58 μm and a surface roughness of 5 nm to a dry thickness of 1.5 μm. The magnetic layer coating solution X was immediately applied to the non-magnetic layer thus formed to a dry thickness of 0.2 μm. While the two layers were wet, the coated material was passed through two alternating magnetic field generating apparatus (frequency: 50 Hz; magnetic field intensity: 250 G and 120 G) so that it was subjected to random orientation. The coated material thus oriented was dried, calendered by a 7-stage calender at a temperature of 90° C. and a linear pressure of 300 kg/cm, punched to a disc having an outer diameter b of 94 mm as shown in FIG. 1, and then subjected to surface polishing. The discs thus obtained are referred to as "Sample No. A-6" for one comprising an aramide support or "Sample No. A'-6" for one comprising a polyethylene naphthalate support.

Subsequently, recording and reproduction of signal were effected on the outermost diameter D (90 mm) of the recording area at a recording density of 90 kfci while the disc was being rotated at 3,000 rpm. The change of reproduced output with the vertical movement of the head relative to the reference level of the disc was then examined. The maximum output and the penetration window, which indicates the range of position of the head that can provide an output of not less than 80% of the maximum output, were then determined. The greater the penetration window is, the more stable is the output that can be obtained. The maximum output of Sample A-6 and Sample A'-6 were each set to 0 dB.

The diameter of the puncher in the punching machine was then altered to prepare aramide-based discs having different outer discs. Thus, Sample Nos. A-1 to A-5, A-7, A-8, and B-1 to B-8 having different outer diameters D of recording The surface roughness of the support and the thickness of the magnetic layer were then altered to prepare aramide-based discs as Sample Nos. A-9 to A-12 and B-9. These samples were then subjected to the same measurement as above.

Discs comprising a polyethylene-terephthalate (PET) as a support were prepared as Samples B-10 to B-13. These samples were then subjected to the same measurement as above.

Sample No. A-13 was then prepared in the same manner as Sample No. A-6 except that the magnetic layer coating solution Y was used. This sample was then subjected to the same measurement as above. The measurements are set forth in Table 1.

Samples (B-1 to B-14 (comparative examples), A-1 to A-13 (examples)) set forth in Table 1 were partly subjected to the same measurement at a rotary speed of 720 rpm. The results are shown in Table 1 as Sample Nos. A-14 to A-17 (examples) and B-15 to B-19 (comparative examples).

TABLE 1

| Sample No. | Magnetic powder | Non-magnetic support | | | Magnetic layer | | Disc | | | | Max. output (dB) | Penetration window ($\mu$m) |
|---|---|---|---|---|---|---|---|---|---|---|---|---|
| | | Kind | d ($\mu$m) | SRa (nm) | Thickness ($\mu$m) | SRa (nm) | D (mm) | D/d | $\alpha$ (rpm) | V (m/s) | | |
| B-1 | M | Aramide | 12 | 5 | 0.2 | 3.2 | 35 | 2.92 | 3000 | 5.5 | −2.3 | 58 |
| A-1 | M | Aramide | 18 | 5 | 0.2 | 2.9 | 35 | 1.94 | 3000 | 5.5 | −0.5 | 344 |
| B-2 | M | Aramide | 32 | 5 | 0.2 | 2.9 | 35 | 1.09 | 3000 | 5.5 | −2.0 | 123 |
| B-3 | M | Aramide | 18 | 5 | 0.2 | 2.9 | 50 | 2.78 | 3000 | 7.9 | −1.8 | 88 |
| A-2 | M | Aramide | 24 | 5 | 0.2 | 2.9 | 50 | 2.08 | 3000 | 7.9 | −0.3 | 321 |
| A-3 | M | Aramide | 28 | 5 | 0.2 | 2.9 | 50 | 1.79 | 3000 | 7.9 | −0.3 | 452 |
| A-4 | M | Aramide | 38 | 5 | 0.2 | 2.9 | 50 | 1.32 | 3000 | 7.9 | −0.6 | 351 |
| B-4 | M | Aramide | 48 | 5 | 0.2 | 2.9 | 50 | 1.04 | 3000 | 7.9 | −2.3 | 118 |
| B-5 | M | Aramide | 32 | 5 | 0.2 | 2.9 | 90 | 2.81 | 3000 | 14.1 | −2.2 | 129 |
| A-5 | M | Aramide | 38 | 5 | 0.2 | 2.9 | 90 | 2.37 | 3000 | 14.1 | −0.4 | 310 |
| A-6 | M | Aramide | 48 | 5 | 0.2 | 2.9 | 90 | 1.88 | 3000 | 14.1 | 0.0 | 427 |
| A-7 | M | Aramide | 62 | 5 | 0.2 | 2.9 | 90 | 1.45 | 3000 | 14.1 | −0.2 | 419 |
| B-6 | M | Aramide | 78 | 5 | 0.2 | 2.9 | 90 | 1.15 | 3000 | 14.1 | −1.9 | 152 |
| B-7 | M | Aramide | 48 | 5 | 0.2 | 2.9 | 140 | 2.92 | 3000 | 22.0 | −3.1 | 45 |
| A-8 | M | Aramide | 78 | 5 | 0.2 | 2.9 | 140 | 1.79 | 3000 | 22.0 | −0.7 | 319 |
| B-8 | M | Aramide | 130 | 5 | 0.2 | 2.9 | 140 | 1.08 | 3000 | 22.0 | −2.2 | 79 |
| A-9 | M | Aramide | 48 | 3 | 0.2 | 2 | 90 | 1.88 | 3000 | 14.1 | 0.6 | 478 |
| A-10 | M | Aramide | 48 | 9 | 0.2 | 4.7 | 90 | 1.88 | 3000 | 14.1 | −0.1 | 355 |
| B-9 | M | Aramide | 48 | 12 | 0.2 | 7 | 90 | 1.88 | 3000 | 14.1 | −2.1 | 112 |
| A-11 | M | Aramide | 48 | 5 | 0.4 | 2.9 | 90 | 1.88 | 3000 | 14.1 | −0.4 | 399 |
| A-12 | M | Aramide | 48 | 5 | 0.7 | 2.9 | 90 | 1.88 | 3000 | 14.1 | −0.6 | 367 |
| B-10 | M | PET | 32 | 5 | 0.2 | 3.2 | 90 | 2.81 | 3000 | 14.1 | −2.4 | 59 |
| B-11 | M | PET | 38 | 5 | 0.2 | 3.2 | 90 | 2.37 | 3000 | 14.1 | −2.1 | 67 |
| B-12 | M | PET | 48 | 5 | 0.2 | 3.2 | 90 | 1.88 | 3000 | 14.1 | −1.7 | 70 |
| B-13 | M | PET | 62 | 5 | 0.2 | 3.2 | 90 | 1.45 | 3000 | 14.1 | −2.0 | 77 |
| B-14 | M | PET | 78 | 5 | 0.2 | 3.2 | 90 | 1.15 | 3000 | 14.1 | −2.3 | 69 |
| A-13 | B | Aramide | 48 | 5 | 0.2 | 3.1 | 90 | 1.88 | 3000 | 14.1 | 1.3 | 441 |
| A-14 | M | Aramide | 22 | 5 | 0.2 | 3.2 | 35 | 1.59 | 720 | 1.3 | 0.1 | 346 |
| A-15 | M | Aramide | 32 | 5 | 0.2 | 3.2 | 50 | 1.56 | 720 | 1.9 | 0.4 | 401 |
| A-16 | M | Aramide | 58 | 5 | 0.2 | 3.2 | 90 | 1.55 | 720 | 3.4 | 0.3 | 336 |
| A-17 | M | Aramide | 92 | 5 | 0.2 | 3.2 | 140 | 1.52 | 720 | 5.3 | 0.0 | 312 |
| B-15 | M | PET | 32 | 5 | 0.2 | 3.2 | 90 | 2.81 | 720 | 3.4 | −1.4 | 198 |
| B-16 | M | PET | 38 | 5 | 0.2 | 3.2 | 90 | 2.37 | 720 | 3.4 | −1.1 | 223 |
| B-17 | M | PET | 48 | 5 | 0.2 | 3.2 | 90 | 1.88 | 720 | 3.4 | −1.2 | 261 |
| B-18 | M | PET | 62 | 5 | 0.2 | 3.2 | 90 | 1.45 | 720 | 3.4 | −0.9 | 287 |
| B-19 | M | PET | 78 | 5 | 0.2 | 3.2 | 90 | 1.15 | 720 | 3.4 | −1.0 | 265 |

Note)
M: ferromagnetic metal fine powder;
B: barium ferrite
D: outermost diameter of recording area;
$\alpha$: rotary speed;
V: peripheral speed of outermost periphery of recording area.

area were prepared. These samples were then subjected to the same measurement as above. During this measurement, signal was recorded at a proper frequency depending on the outer diameter D of the area to be measured so that the recording density was 90 kfci.

Similarly to the aramide-based samples, the diameter of the puncher in the punching machine was then altered to prepare polyethylene naphthalate-based discs having different outer discs. Thus, Sample Nos. A'-1 to A'-5, A'-7, A'-8, and B'-1 to B'-8 having different outer diameters D of recording area were prepared. These samples were then subjected to the same measurement as above. During this measurement, signal was recorded at a proper frequency depending on the outer diameter D of the area to be measured so that the recording density was 90 kfci.

The surface roughness of the support and the thickness of the magnetic layer were then altered to prepare aramide-based discs as Sample Nos. A'-9 to A'-12 and B'-9. These samples were then subjected to the same measurement as above.

Discs comprising a polyethylene terephthalate (PET) as a support were prepared as Sample Nos. B'-10 to B'-13. These samples were then subjected to the same measurement as above.

Sample No. A'-13 was then prepared in the same manner as Sample No. A'-6 except that the magnetic layer coating solution Y was used. This sample was then subjected to the same measurement as above. The measurements are set forth in Table 2.

Samples (B'-1 to B'-13 (comparative examples), A'-1 to A'-13 (examples)) set forth in Table 2 were partly subjected to the same measurement at a rotary speed of 720 rpm. The results are set forth in Table 2 as Sample Nos. A'-14 to A'-17 (examples) and B'-14 to B'-16 (comparative examples).

Comparison of examples with comparative examples

As is apparent from the results of Tables 1 and 2, the disc media according to the present invention not only exhibit a high maximum output but also show a wide head penetration window and a stable output. It can also be seen that Sample Nos. B-10 to B-17 and B'-10 to B'-17, which comprise a conventional PET, not only exhibit a low output but also show a narrow penetration window. The media of the present invention comprising a polyethylene naphthalate and having the relationship according to the present invention between the outermost diameter D of the recording area and the thickness d of the non-magnetic support show a remarkably wider penetration window than those comprising a conventional PET particularly when rotated at a high speed.

Description of measurement process

For the measurement of central plane average surface roughness SRa (referred to as "surface roughness" in the tables) of the support and magnetic layer, mirau method was effected using TOPO3D (available from WYKO). In some detail, an area of about 250 nm×250 nm was measured for SRa. The measurements were subjected to spherical correction and cylindrical correction at a measurement wavelength of about 650 nm. In this measurement process, a noncontact surface roughness meter using light interference was used.

TABLE 2

| Sample No. | Magnetic powder | Non-magnetic support | | | Magnetic layer | | Disc | | | | Max. output (dB) | Penetration window ($\mu$m) |
|---|---|---|---|---|---|---|---|---|---|---|---|---|
| | | Kind | d ($\mu$m) | SRa (nm) | Thickness ($\mu$m) | SRa (nm) | D mm | D/d | $\alpha$ (rpm) | V (m/s) | | |
| B'-1 | M | PEN | 15 | 5 | 0.2 | 3.2 | 35 | 2.33 | 3000 | 5.5 | −2.1 | 84 |
| A'-1 | M | PEN | 22 | 5 | 0.2 | 3.2 | 35 | 1.59 | 3000 | 5.5 | −0.5 | 324 |
| B'-2 | M | PEN | 42 | 5 | 0.2 | 3.2 | 35 | 0.83 | 3000 | 5.5 | −1.8 | 97 |
| B'-3 | M | PEN | 22 | 5 | 0.2 | 3.2 | 50 | 2.27 | 3000 | 7.9 | −1.7 | 95 |
| A'-2 | M | PEN | 28 | 5 | 0.2 | 3.2 | 50 | 1.79 | 3000 | 7.9 | −0.4 | 286 |
| A'-3 | M | PEN | 32 | 5 | 0.2 | 3.2 | 50 | 1.56 | 3000 | 7.9 | −0.2 | 401 |
| A'-4 | M | PEN | 42 | 5 | 0.2 | 3.2 | 50 | 1.19 | 3000 | 7.9 | −0.6 | 326 |
| B'-4 | M | PEN | 58 | 5 | 0.2 | 3.2 | 50 | 0.86 | 3000 | 7.9 | −2.2 | 112 |
| B'-5 | M | PEN | 42 | 5 | 0.2 | 3.2 | 90 | 2.14 | 3000 | 14.1 | −1.9 | 110 |
| A'-5 | M | PEN | 48 | 5 | 0.2 | 3.2 | 90 | 1.88 | 3000 | 14.1 | −0.4 | 298 |
| A'-6 | M | PEN | 58 | 5 | 0.2 | 3.2 | 90 | 1.55 | 3000 | 14.1 | 0.0 | 367 |
| A'-7 | M | PEN | 72 | 5 | 0.2 | 3.2 | 90 | 1.25 | 3000 | 14.1 | −0.1 | 328 |
| B'-6 | M | PEN | 92 | 5 | 0.2 | 3.2 | 90 | 0.98 | 3000 | 14.1 | −1.7 | 131 |
| B'-7 | M | PEN | 58 | 5 | 0.2 | 3.2 | 140 | 2.41 | 3000 | 22.0 | −2.7 | 70 |
| A'-8 | M | PEN | 92 | 5 | 0.2 | 3.2 | 140 | 1.52 | 3000 | 22.0 | −0.5 | 319 |
| B'-8 | M | PEN | 150 | 5 | 0.2 | 3.2 | 140 | 0.93 | 3000 | 22.0 | −2.2 | 101 |
| A'-9 | M | PEN | 58 | 3 | 0.2 | 2.2 | 90 | 1.55 | 3000 | 14.1 | 0.5 | 388 |
| A'-10 | M | PEN | 58 | 9 | 0.2 | 5 | 90 | 1.55 | 3000 | 14.1 | −0.2 | 336 |
| B'-9 | M | PEN | 58 | 12 | 0.2 | 7.3 | 90 | 1.55 | 3000 | 14.1 | −1.9 | 152 |
| A'-11 | M | PEN | 58 | 5 | 0.4 | 3.2 | 90 | 1.55 | 3000 | 14.1 | −0.3 | 370 |
| A'-12 | M | PEN | 58 | 5 | 0.7 | 3.2 | 90 | 1.55 | 3000 | 14.1 | −0.7 | 361 |
| B'-10 | M | PET | 22 | 5 | 0.2 | 3.2 | 35 | 1.59 | 3000 | 5.5 | −1.6 | 102 |
| B'-11 | M | PET | 32 | 5 | 0.2 | 3.2 | 50 | 1.56 | 3000 | 7.9 | −1.8 | 141 |
| B'-12 | M | PET | 58 | 5 | 0.2 | 3.2 | 90 | 1.55 | 3000 | 14.1 | −1.4 | 122 |
| B'-13 | M | PET | 69 | 5 | 0.2 | 3.2 | 140 | 1.52 | 3000 | 22.0 | −1.7 | 98 |
| A'-13 | B | PEN | 58 | 5 | 0.2 | 3.5 | 90 | 1.55 | 3000 | 14.1 | 1.1 | 393 |
| A'-14 | M | PEN | 22 | 5 | 0.2 | 3.2 | 35 | 1.59 | 720 | 1.3 | 0.1 | 388 |
| A'-15 | M | PEN | 32 | 5 | 0.2 | 3.2 | 50 | 1.56 | 720 | 1.9 | 0.3 | 432 |
| A'-16 | M | PEN | 58 | 5 | 0.2 | 3.2 | 90 | 1.55 | 720 | 3.4 | 0.2 | 390 |
| A'-17 | M | PEN | 92 | 5 | 0.2 | 3.2 | 140 | 1.52 | 720 | 5.3 | −0.1 | 334 |
| B'-14 | M | PET | 22 | 5 | 0.2 | 3.2 | 35 | 1.59 | 720 | 1.3 | −0.5 | 227 |
| B'-15 | M | PET | 32 | 5 | 0.2 | 3.2 | 50 | 1.56 | 720 | 1.9 | −0.4 | 289 |
| B'-16 | M | PET | 58 | 5 | 0.2 | 3.2 | 90 | 1.55 | 720 | 3.4 | −0.5 | 261 |
| A'-17 | M | PET | 92 | 5 | 0.2 | 3.2 | 140 | 1.52 | 720 | 5.3 | −0.5 | 228 |

Note)
M: ferromagnetic metal fine powder;
B: barium ferrite
D: outermost diameter of recording area;
$\alpha$: rotary speed;
V: peripheral speed of outermost periphery of recording area.

For the measurement of the thickness of the magnetic layer, a section of the magnetic layer was prepared. The section was photographed under a scanning electron microscope (S-700, available from Hitachi, Ltd.) to give a sectional photograph from which the thickness of the magnetic layer was then determined.

For the measurement of the thickness d of the non-magnetic support, a digital thickness meter ("MINICON" available from Tokyo Seimitsu Co., Ltd.) was used. The value was averaged over 10 or more samples.

While the invention has been described in detail and with reference to specific embodiments thereof, it will be apparent to one skilled in the art that various changes and modifications can be made therein without departing from the spirit and scope thereof.

What is claimed is:

1. A disc shaped magnetic recording medium comprising a substantially non-magnetic layer and a magnetic layer provided on a non-magnetic support in this order, said magnetic layer comprising a ferromagnetic metal fine powder or ferromagnetic hexagonal ferrite fine powder dispersed in a binder, wherein said non-magnetic support is an aramide or polyethylene naphthalate having a central plane average surface roughness SRa of not more than 10 nm and there is the following relationship between the thickness d ($\mu$m) of the non-magnetic support and the outermost diameter D (mm) of the recording area:

$1.25 \leq D/d \leq 2.50$ (when the non-magnetic support is an aramide)

$1.00 \leq D/d \leq 2.00$ (when the non-magnetic support is a polyethylene naphthalate).

2. The disc shaped magnetic recording medium as in claim 1, wherein the outermost diameter of the recording area is from 35 mm to less than 70 mm and recording and reproduction are effected on the outermost periphery of the recording area at a peripheral speed of not less than 5 m/sec.

3. The disc shaped magnetic recording medium as in claim 1, wherein recording and reproduction are effected on the outermost periphery of the recording area at a peripheral speed of not less than 10 m/sec and the central plane average surface roughness SRa of said magnetic layer is not more than 5 nm.

* * * * *